United States Patent
Gerrits et al.

(12)

(10) Patent No.: US 6,475,578 B1
(45) Date of Patent: Nov. 5, 2002

(54) FLEXIBLE PACKAGING PEELABLE SEAL SYSTEM

(75) Inventors: Lisa King Gerrits, Menasha; Russell P. Gehrke; Paul T. Greisinger, both of Neenah, all of WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 08/968,369

(22) Filed: Nov. 12, 1997

(51) Int. Cl.[7] ............... B32B 27/30; B32B 27/32; B65D 30/02; B65D 65/40
(52) U.S. Cl. .............. 428/35.7; 428/36.91; 428/515; 428/516; 428/517; 428/520; 428/521; 428/522; 428/523; 383/35; 383/210
(58) Field of Search ............... 428/35.7, 35.5, 428/36.91, 40.1, 35.2, 41.3, 515, 516, 517, 520, 521, 522, 523; 383/35, 210

(56) References Cited

U.S. PATENT DOCUMENTS 4,883,693 A  *  11/1989  Ohya et al. ............... 428/34.9
6,018,003 A  *  1/2000  Sullivan et al. ........... 525/333.8

FOREIGN PATENT DOCUMENTS

WO        WO-9516743 A1  *  6/1995

OTHER PUBLICATIONS

Polymer Science Dictionary; Second Edition; Edited by Alger; p. 185, 1997.*

* cited by examiner

Primary Examiner—Michael Barr
Assistant Examiner—Elena Tsoy
(74) Attorney, Agent, or Firm—McDermott, Will & Emery

(57) ABSTRACT

Multilayer films and packaging structure made therefrom which incorporate a peelable seal which operates via two peel mechanisms which are temperature dependent. The multilayered films and the packages in which they are utilized, have multiple layers including a fifth layer comprising high density polyethylene; a fourth layer comprising high density polyethylene, a third layer comprising high density polyethylene; a second layer comprising high density polyethylene and polybutylene and a first layer comprising ethylene vinyl acetate copolymer, polyethylene plastomer and polybutylene.

24 Claims, 6 Drawing Sheets

FLEXIBLE PACKAGING PEELABLE SEAL SYSTEM

FIELD OF THE INVENTION

The present invention relates to heat sealable packages wherein the packages are made of multilayer polymeric films. Move particularly, the invention relates to polymeric films which incorporate two peel mechanisms which are temperature dependent.

Packages made of polymeric film having this feature are highly desirable in the packaging industry because they allow the package fabricator greater flexibility in sealing temperatures without compromising the ease in opening the package by the consumer. Background of the Invention The present invention provides easy open, peelable seal packages which are made of multilayer polymeric films and contain a variety of food and non-food products. The packages of the present invention are heat-sealed over a wide range of sealing temperatures to a closed position to contain and to protect the products contained therein. These packages can be opened by application of force at a designated position on the package. Since the multilayer polymeric film which makes up the packages incorporates two peel mechanisms, the packages open via a surface peel or a delamination peel mechanism wherein said mechanism is dependent on sealing temperature.

The technology of peelable seal, easy-open packaging has been employed initially in the food industry with expanding applications over the years into non-food arcs U.S. Pat. No. 4,944,409 issued to Busche and Bostian (the "409" patent) discloses an package which is adopted to be heat sealed to a closed position, The subject package includes a first and second package wall. The first wall comprises a thermoplastic polymeric film construction having an outer layer, an inner sealant layer and a tie layer disposed between and cohesively bonded to either the inner layer or the outer layer. The package disclosed in the "409" patent has only one seal mechanism. Therefore, a need exists in this area of technology to develop a peelable seal package which has the following features: (1) constructed of polymeric film; (2) employs two peelable seal mechanisms which are dependent on sealing temperature; (3) sealed closed after insertion of product over a wide range of sealant temperatures; and (4) opened by the consumer using an acceptable level of force.

SUMMARY OF THE INVENTION

The present invention relates to easy-open, peelable. seal packages which can be sealed closed after insertion of product over a wide range of sealant temperatures and having two peel mechanisms. The packages are typically constructed on form/fill/seal equipment which joins together the sides and bottom of a web of polymeric film to form an open pouch, then inserts the product, and then seals the remaining portion (typically the top) closed.

The packages of the present invention can be opened by the consumer via either of two peel mechanisms; a surface peel mechanism or a delamination peel mechanism.

A surface peel mechanism is that mechanism which operates by failure of the adhesive bond between the interface of layer one of the first package wall with layer one of the second package wall (See FIG. 6 and FIG. 7). A surface peel mechanism operates at sealant temperatures below 210° F., preferably between 180° F. and 210° F.). A delamination peel mechanism is that mechanism which operates by failure of the cohesive bond between layer two and layer one (See FIG. 4 and FIG. 5) with tearing through layer one. A delamination peel mechanism operates at sealant temperature above 210° F., (preferably between 210° F. to 250° F.).

The choice of peel mechanisms will be determined by the sealing temperature. The sealing temperature is that temperature which is employed to seal the package after the insertion of the product. Specifically, the sealing temperature is that temperature used to seal the first layer of the first package wall to the second package wall to create a totally closed package. A sealing temperature range suitable for use in the present invention is between 180° F. to 250° F.

Generally, the higher the sealing temperature, the higher the amount of force required by the consumer to open the package. Therefore, it becomes important to maintain the sealing temperature at an acceptable range so that a minimum amount of force is required by the consumer to open the package. Also, it is desirable for the fabricator of the totally closed package that a wide range of sealing temperatures be available in order to allow for greater flexibility in the fabrication process (i.e., sealing temperatures do not have to be monitored so closely).

The present invention also relates to a multilayer polymeric film construction comprising two or more layers wherein each layer consists of a single polymeric material or a combination of polymeric material.

In a first preferred embodiment, the invention provides an easy open package adopted to be heat sealed closed over a wide range of sealing temperatures in order to contain and protect the product within the package. The package is easily opened by the application of a manual force along the intersurface of first package wall and the intersurface of the second package wall. The package includes a first package wall having a multilayer film construction. The multilayer film construction includes in one embodiment the following layers: a fifth layer; a fourth layer; a third layer; a second layer comprising high density polyethylene (HDPB) and polybutylene (PB) and a first layer comprising ethylene vinyl acetate copolymer (EVA), plastomer and polybutylene (PB). The package also includes a second package wall joined at a portion of its perimeter to the first package wall. The first layer of first package wall is heat sealed to the second package wall to create a sealed package. The temperature at which the first layer of the first package wall is heat sealed to the first layer of the second package wall to create a sealed package will determine which of the two peel mechanisms will be employed to open the package.

In a second, preferred embodiment, the first package wall has a multilayer film construction specifically including the following layers: a fifth layer comprising high density polyethylene; a fourth layer comprising high density polyethylene; a third layer comprising high density polyethylene; a second layer comprising high density polyethylene and polybutylene and a first layer comprising ethylene vinyl acetate copolymer, polyethylene plastomer and polybutylene such that a controlled cohesive bond is formed either between said second layer and said first layers or, between the first layer of the first package wall and the first layer of the second package wall. The package also includes the second package wall joined at its perimeter to the first package wall, that is part of the same original web of polymeric film.

In a third, preferred embodiment, the first package wall has a multilayer film construction specifically including the following layers, a fifth layer comprising high density polyethylene; a fourth layer comprising a polymer selected from the group consisting of high density polyethylene and linear low density polyethylene, or a blend of high density polyethylene and linear low density polyethylene, a third layer comprising high density polyethylene; a second layer comprising high density polyethylene and polybutylene and a first layer comprising ethylene vinyl acetate copolymer, plastomer and polybutylene such that a controlled cohesive bond is formed either between said second layer and said first layer or between the first layer of the first package wall and the first layer of the second package wall. The package also includes the second package wall joined at its perimeter to the first package wall, that is part of the same original web of polymeric film.

In an especially preferred embodiment, the first layer of either the first package wall or the second package wall or both package walls comprises approximately 20 to 50 percent of ethylene vinyl acetate copolymer with 30 to 40 percent being preferred; approximately 30 to 60 percent of plastomer with 40 to 50 percent being preferred; and approximately 5 to 25 percent of polybutylene with 10 to 20 percent being preferred.

In another embodiment of the present invention, the invention provides a multilayer film construction comprising two layers: a first layer comprising ethylene vinyl acetate copolymer, plastomer and polybutylene which is adjacent to a second layer comprising high density polyethylene and polybutylene. This multilayer film construction can be bonded to one or more other polymeric layers.

In a preferred embodiment of a multilayer film construction comprising two layers: a first and second layer, the first layer comprises approximately 20 to 50 percent of ethylene vinyl acetate copolymer with 30 to 40 percent being preferred; approximately 30 to 60 percent of a plastomer with 40 to 50 percent being preferred; and approximately 5 to 25 percent of polybutylene with 10 to 20 percent being preferred; and the second layer comprises approximately 20 to 80 percent of polyethylene with 40 to 60 percent being preferred and approximately 20 to 80 percent of polybutylene with 40 to 60 percent being preferred.

BRIEF DESCRIPTION OF THE DRAWINGS

Other objects and advantages of the invention will become apparent upon reading the following detailed description and upon reference to the drawings in which.

While the invention will be described in connection with certain preferred embodiments, it is not intended to limit the invention to the specific exemplary embodiments. On the contrary, it is intended to cover all alternatives, modifications, and equivalents as may be included within the spirit and scope of the invention as defined by the appended claims.

DESCRIPTION OF THE PREFERRED EMBODIMENTS

Figure 1:
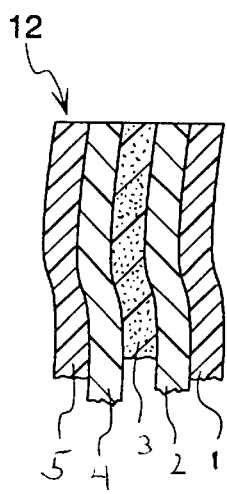
FIG. 1 is a side sectional view of the multilayer film of the instant invention.

Turning now to the drawings, FIG. 1 depicts the multilayer film 12 of the instant invention. The multilayer film 12 is composed of five distinct layers of resin and/or resins combinations. The inside, or first layer 1 is preferably made of ethylene vinyl acetate copolymer, plastomer and polybutylene. As shown in FIG. 1, it is the first layer 1 which is heat sealed to a second package film 14 to form a closed package. The heat seal area is indicated by cross-hatching, the first layer 1 is a thin layer, preferably measuring only approximately ten percent of the total thickness of the multilayer film 12 of the instant invention. The first layer 1 is comprised of a combination of resins. Preferred resins are exemplified by Exxon® 721-62, Exxon® 3131, Shell® DP1560 and Ampacet 10516. The ethylene vinyl acetate copolymer comprises from 20 to 50 percent of layer 1 with 30 percent being preferred. The plastomer comprises from 30 to 60 percent of layer 1 with 45 percentage being preferred. The polybutylene comprises approximately 5 to 25 percent of layer 1 with 15 percent being preferred.

| EVA + Plastomer + PB Peelable | HDPE + PB Peelable | HDPE | HDPE + LLDPE + Plastomer | HDPE |
| --- | --- | --- | --- | --- |

The second layer 2 is preferably made of a combination of high density polyethylene and polybutylene. The high density polyethylene comprises from 20 to 80 percent of layer 2 with 50 percent being preferred. Polybutylene comprises from 20 to 80 percent of layer 2 with 50 percent being preferred. Layer 2 comprises 5 percent of the total thickness of film 12. Preferred high density polyethylene resins useful in the practice of the invention are exemplified.

Preferably layer 2 is comprised of a combination of Chevron® 9662T and Shell® 0200. Chevron® 9662T is a high density polyethylene and Shell® 0200 is a polybutylene. This above combination of resins allows the first layer 1 and the second layer 2 to separate while maintaining adhesion between the layer 2 and layer 3 when a delamination mechanism is employed.

Layer 3 comprises high density polyethylene. High density polyethylenes suitable for the practice of this invention are exemplified by Chevron® 9662T. Layer 3 comprises 5 percent of total thickness of film 12.

Layer 4 in one embodiment comprises high density polyethylene. High density polyethylene suitable for the practice of this invention are exemplified by Chevron® 9662T. Layer 4 comprises 5 percent of the total thickness of film 12. Layer 4 can also comprise a polymer selected from the group consisting of high density polyethylenes, linear low density polyethylenes, plastomers or a blend wherein the components of the blend are selected from the group consisting of a high density polyethylene, linear low density polyethylene and plastomers. In a blend of high density polyethylene, linear low density polyethylene and plastomers, the high density polyethylene comprises from 30 to 70 percent of the blend with 50 percent being preferred; linear low density polyethylene comprises from 20 to 40 percent of blend with 30 percent being preferred and the plastomer comprises from 30 to 70 percent of the blend with 50 percent being preferred.

Layer 5 comprises high density polyethylene. High density polyethylenes suitable for the practice of this invention is exemplified by Chevron® 9662T. Layer 5 comprises approximately 75 percent of the total thickness of film 12. Layer 5 is the side of the multilayer film that may be laminated to other layers including forming webs and non-forming webs, both printed and unprinted. The total thickness of the multilayer film 12 is approximately 1.80 mils.

Provided below is a simple illustration of the five layer multilayer film of the instant invention.

| EVA | HDPE | HDPE | HDPE | HDPE |
|-----|------|------|------|------|
| ++ | | + | | |
| Plastomer | PB | | LLDPE | |
| + | Peelable | | | |
| PB | | | | |
| Peelable | | | | |

Figure 2:
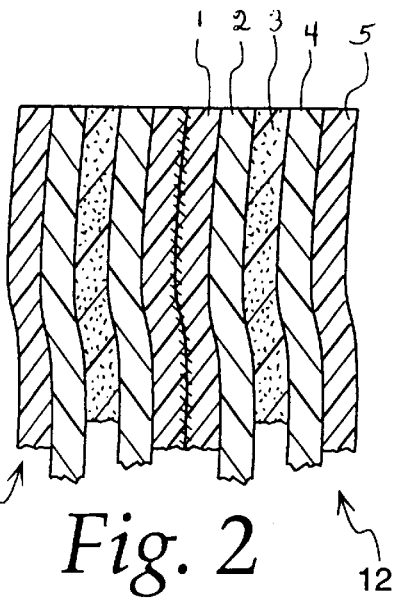
FIG. 2 is a side sectional view of the multilayer film shown in FIG. 1 heat sealed to an opposing package film.

FIG. 2 shows the multilayer film 12 shown m FIG. 1 heat sealed to an opposing package film wall 14. In order to ensure adequate heat sealing between the two multilayer packaging films, 12 and 14, the first, external layer 1 of the first multilayer package film should be of the same or a similar composition to the second packaging film 14. If the second packaging film 14 is a multilayered film, the layer which contacts the first external layer of the first multilayered film 12 should be of the same or a similar composition. Thus if the first layer of the first multilayer. package film 12 is made up of EVA, plastomer and PB, the second package film 14 or if multilayered, the layer of package film 14 which is heat sealed to the first multilayer film 12, should also be made of EVA, plastomer and PB. In an especially preferred embodiment, the composition of the first and second multilayer films 12, 14 which constitute the walls of a package are mirror images of each other. An exception to the above discussion would be in the use of horizontal film where you can seal the above described technology to plain EVA films. The addition of polybutylene (PB) is not absolutely necessary for the second web.

Figure 3:
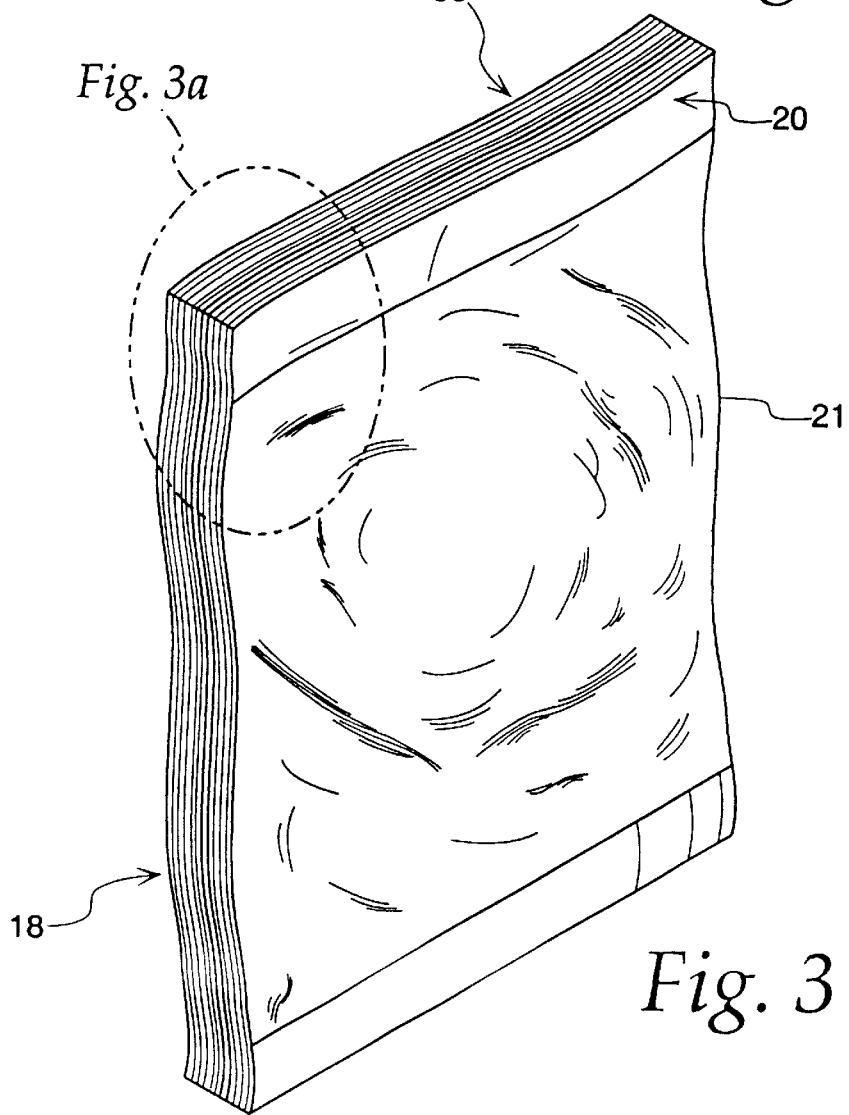
FIG. 3 is a view of a heat sealed package which incorporates the multilayer film of the instant invention.
Figure 3A:
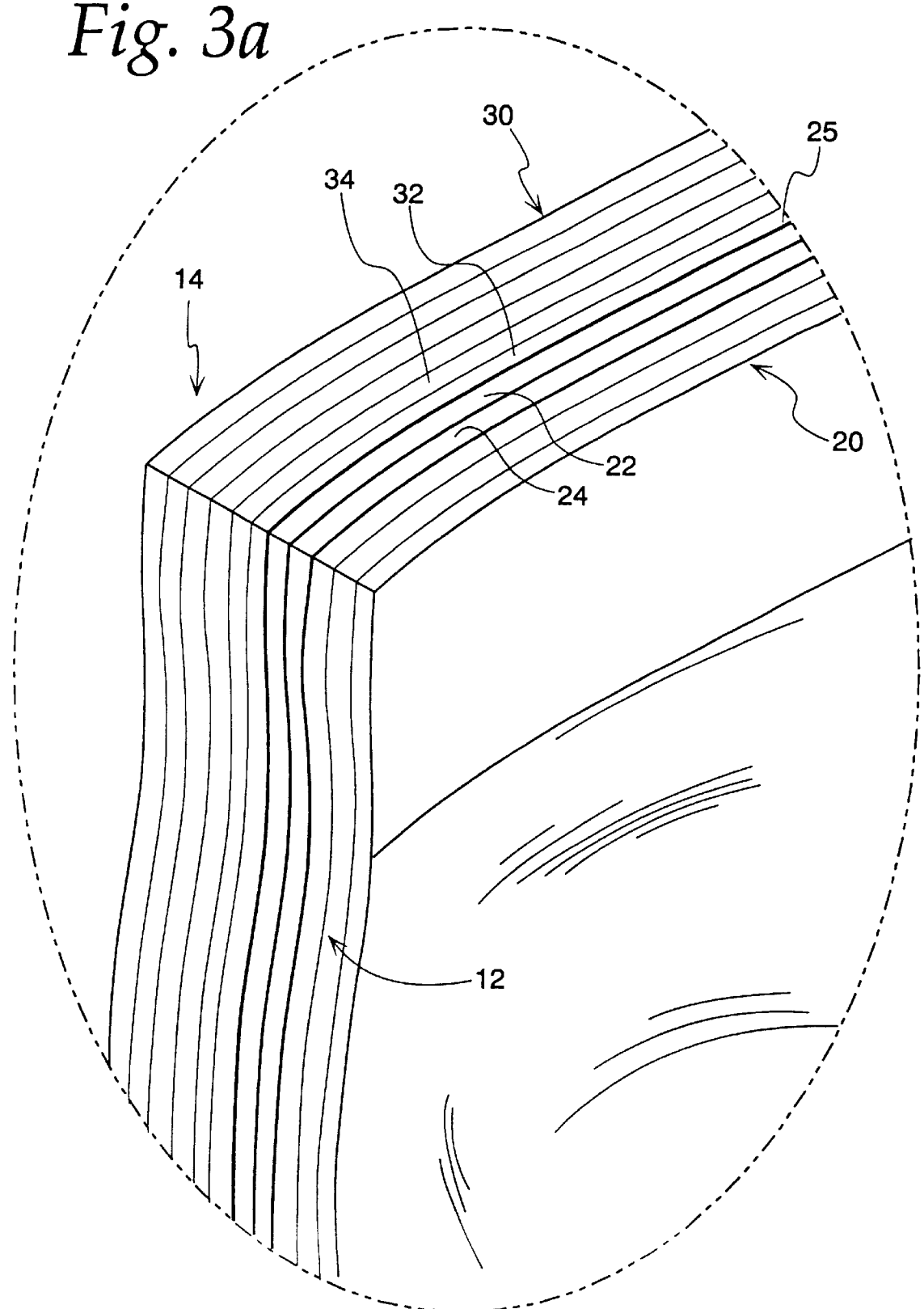
FIG. 3a is a magnified view of a portion of the package depicted in FIG. 3.

FIG. 3 shows a package 18 having first and second package walls 20, 30 having multilayer film construction. Preferably,the composition of each layer of each of the FIG. 3a is a magnified view of the area of FIG. 3 identified by the dotted circle. The bond formed between the first, external layer 22 of the first package wall 20 and the first external layer 32 of the second package wall 30 has a greater bond strength than the peelable bond between the first external layer 22 of the first package wall 20 and the second layer 24 of the first package wall 20 such that upon application of digital pull-apart force, the first and second package walls 20, 30 will remain bonded together and the delimitation peel will occur at the peelable bond between the first, external layer 22 and the second, be layer 24 of the first package wall 20. Of course, delamination peel may occur first between the first, external layer 32 and the second, tie layer 34 of the second package wall 30.

This delamination peel mechanism will occur if the package was sealed at a sealant temperature above 210° F.

A second peel mechanism (not shown in FIG. 3A)—a surface peel—will take place at the interface of first layer 22 of the first package wall with the second package wall. The surface. peel will occur if the package was sealed at a sealant temperature below 210° F.

Figure 4:
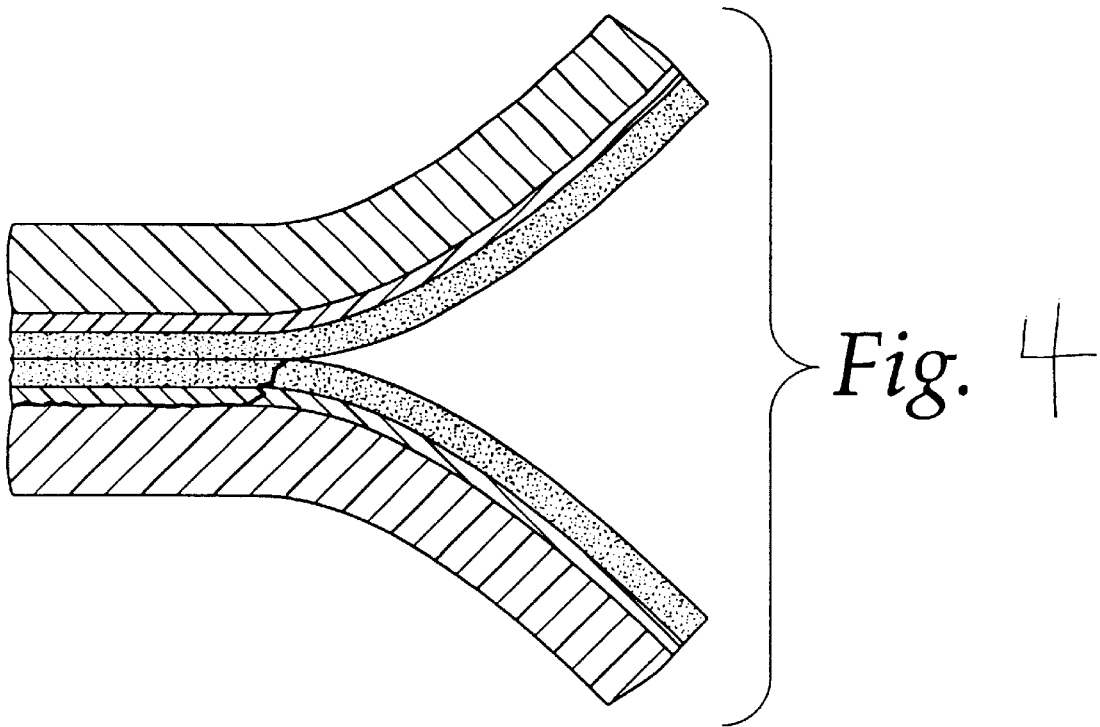
FIG. 4 is a delamination peel.
Figure 5:
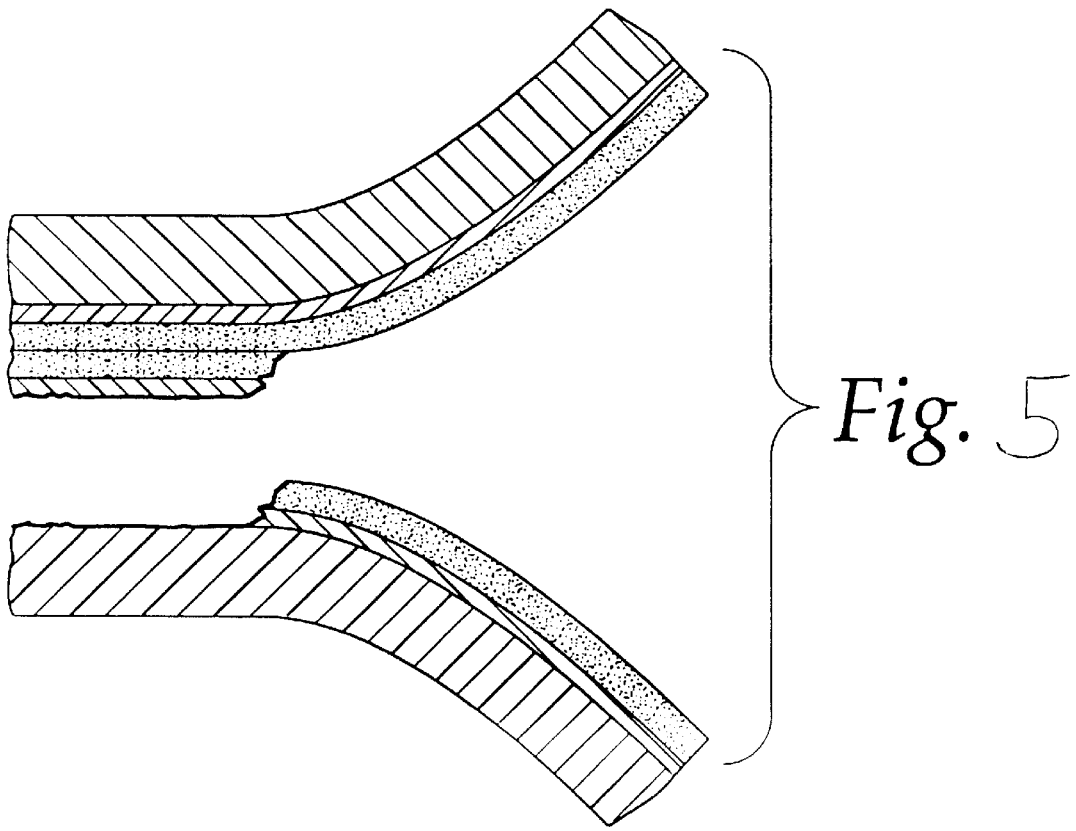
FIG. 5 is a delamination peel after opening.

FIG. 4 shows a delamination pod before being completely opened. FIG. 5 shows a delamination peel after opening. As is shown in both FIG. 4 and FIG. 5, the peel mechanism operates by failure between layers 1 and 2 interface along with tearing through layer 1.

Figure 6:
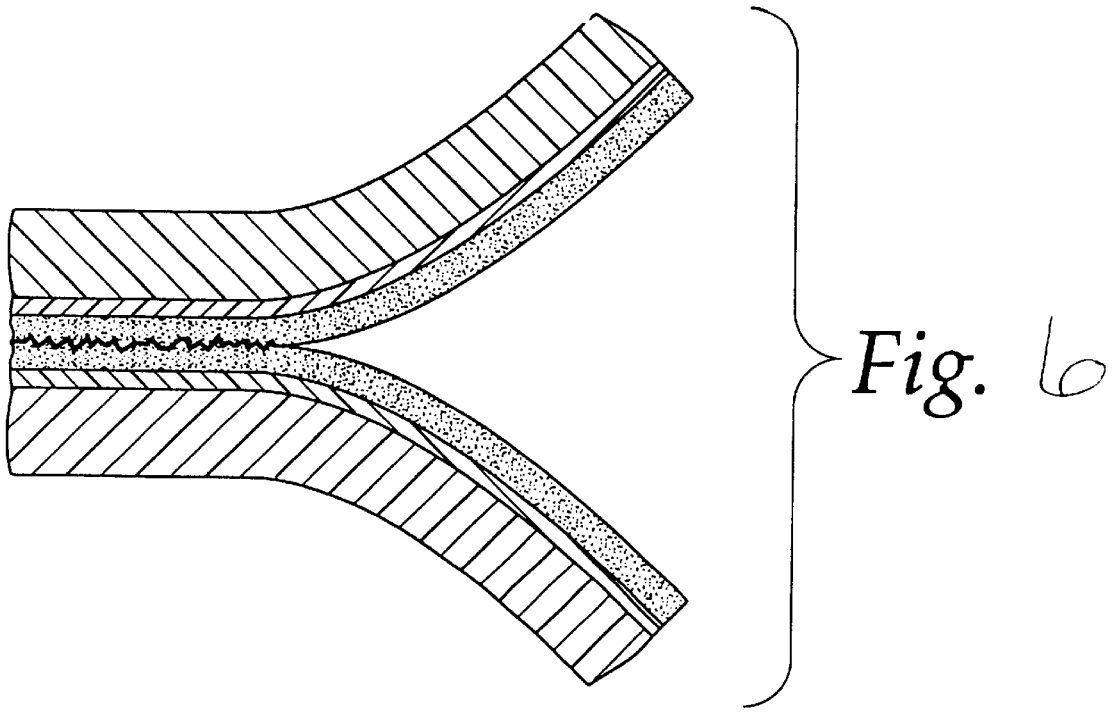
FIG. 6 is a surface peel.
Figure 7:
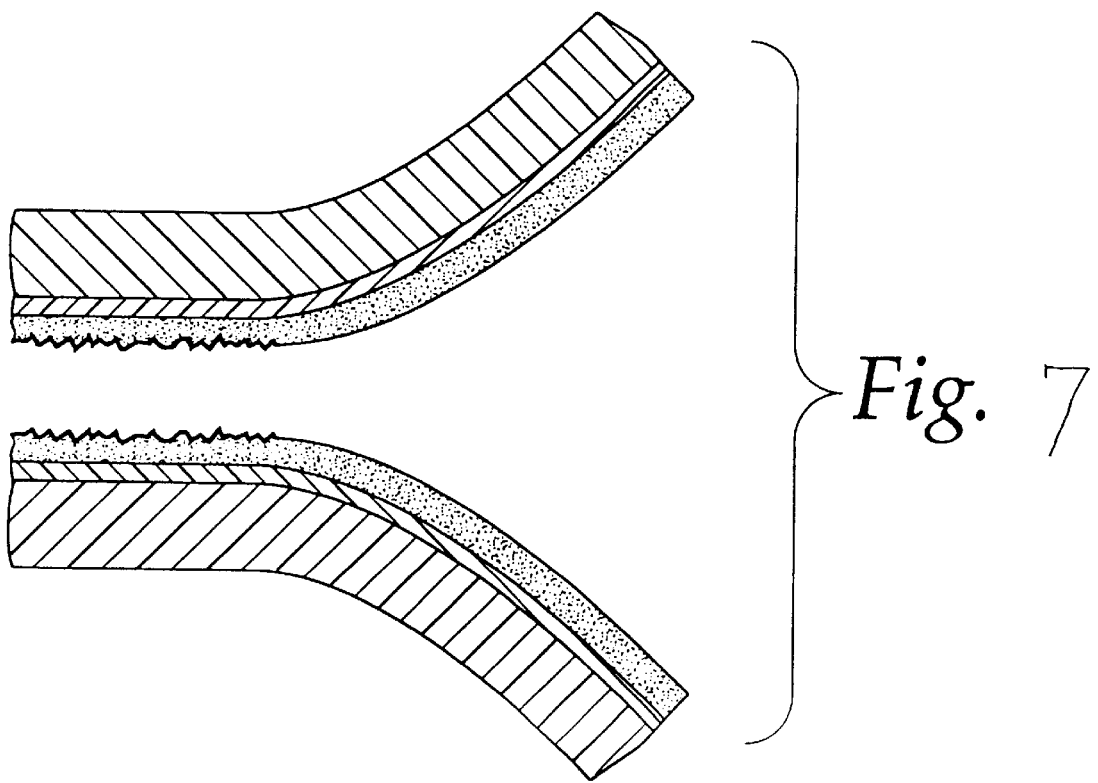
FIG. 7 is a surface peel after opening.

FIG. 6 shows a surface peel before being completely opened. FIG. 7 shows a surface peel after opening. As is shown in both FIG. 6 and FIG. 7, the peel mechanism operates by failure at the seal interface of layer I of the fast package wall with the second package wall.

Figure 8:
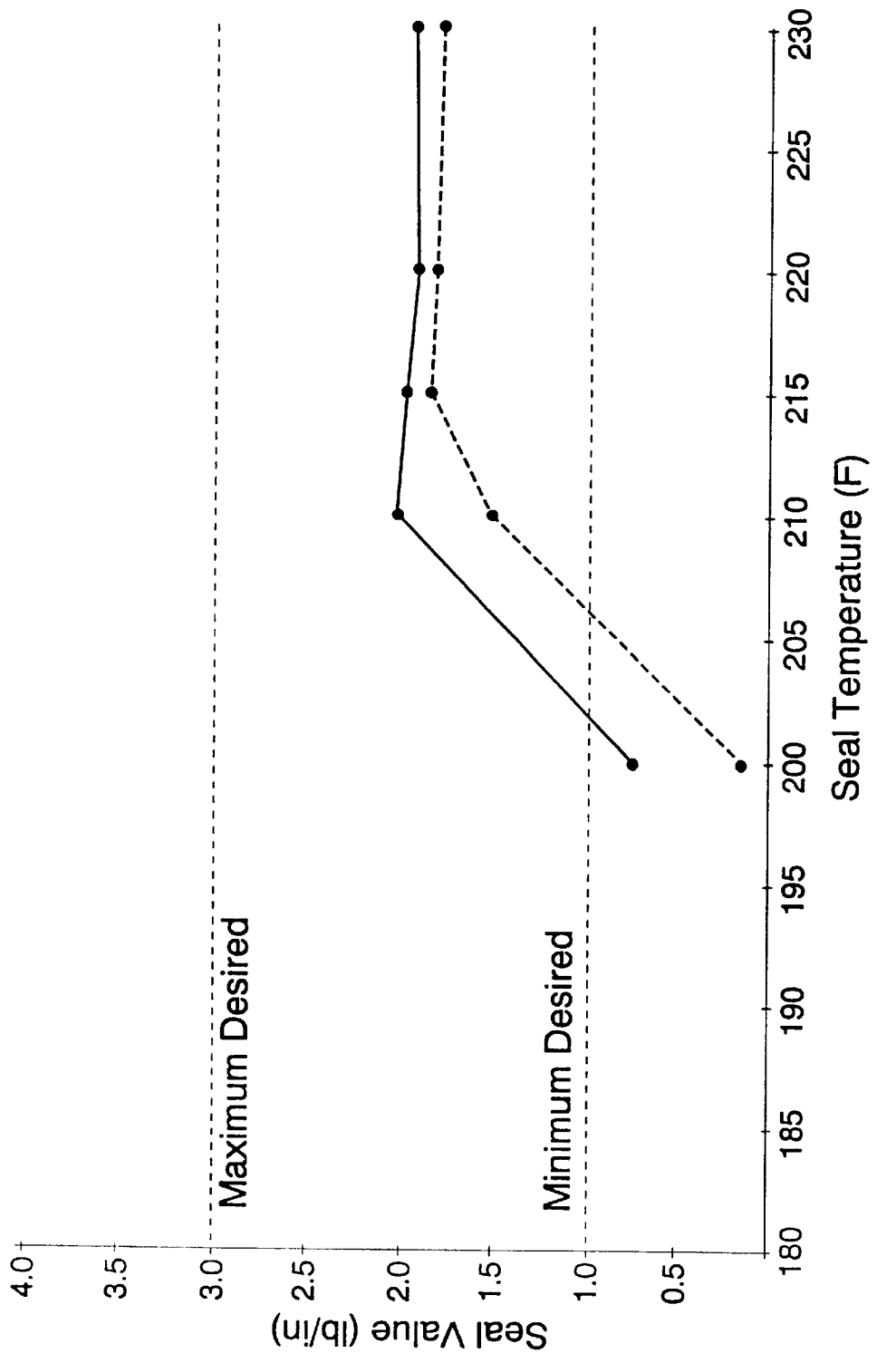
FIG. 8 is a heat seal profile of a preferred embodiment of the present invention.

FIG. 8 shows the heat seal profile for a preferred embodiment of the present invention (Example 1). As is shown by FIG. 8, a rise in sealant temperature does not precipitate a rise in seal value. Seal value is defined as the force expressed in lb/in needed to open the package. Therefore, the packages of the present invention are capable of being sealed closed over a wide range of sealant temperatures while still maintaining their easy-open feature.

Figure 9:
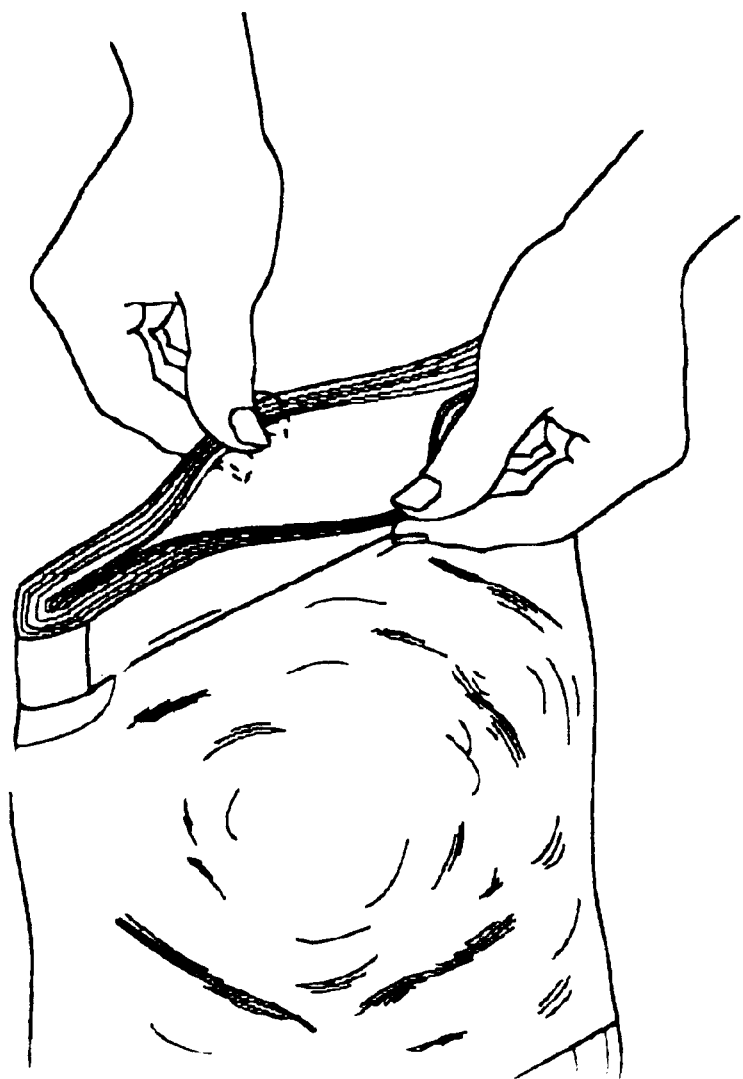
FIG. 9 is a view of a consumer opening the heat sealed package which incorporates the multilayer film of the instant invention.

FIG. 9 shows a package of the present invention being opened by a consumer.

Provided below is a chart which illustrates a preferred embodiment of the present invention.

SPECIFICATION:
TOTAL CALIPER: 1.80 Mil

| | RESIN | FILM DENSITY (G/CC) | % OF LAYER | % OF WEB | LAYER DENSITY (G/CC) | COMPONENT % OF WEB | LAYER WT. % OF WEB | COMPONENT WT. (LB/REAM) | LAYER WT. (LB/REAM) | LAYER CALIPER (MIL) |
|---|---|---|---|---|---|---|---|---|---|---|
| LAYER 5 | Chevron 9662T | 0.957 | 100.0% | 66.0% | 0.9570 | 66.33% | 66.33% | 17.73 | 17.73 | 1.19 |
| LAYER 4 | Chevron 9662T | 0.957 | 100.0% | 8.0% | 0.9570 | 8.04% | 8.04% | 2.15 | 2.15 | 0.14 |
| LAYER 3 | Chevron 9662T | 0.957 | 100.0% | 11.0% | 0.9570 | 11.05% | 11.05% | 2.95 | 2.95 | 0.20 |
| LAYER 2 | Chevron 9662T | 0.957 | 50.0% | 5.0% | 0.9340 | 2.45% | 4.90% | 0.66 | 1.31 | 0.09 |
| | Shell 0200 | 0.912 | 50.0% | | | 2.45% | | 0.66 | | |
| LAYER 1 | Exxon 721.62 | 0.939 | 31.0% | 10.0% | 0.9214 | 3.00% | 9.68% | 0.80 | 2.59 | 0.18 |
| | Exxon 3131 | 0.897 | 44.0% | | | 4.26% | | 1.14 | | |
| | Shell DP1560 | 0.892 | 15.0% | | | 1.45% | | 0.39 | | |
| | Ampacet 10516 | 1.037 | 10.0% | | | 0.97% | | 0.26 | | |
| TOTAL | | | | 100.0% | | 100.0% | 100.0% | BASIS WT. = | 26.73 | 1.80 | package walls 20, 30 is the same as detailed above in reference to the construction of the multilayer film 12 shown in FIG. 1I The first package wall 20 is joined at a portion of its perimeter 21 to the second package wall 30 which preferably has an identical five layer film structure to create a sealed package.

As is true of all of the packages incorporating the multilayer film 12 of the instant invention, additional layers (not shown) of polymeric or non-polymeric maternal such a paper or foil may be bonded to the fifth, external layer of the multilayer film 12. Multilayer films of the instant invention can be formed by any of the conventional processes for making films and multilayer films including laminations, extrusions, coextrusion, blown extrusion, tubular water quench extrusion, extrusion coating and the like. Coextrusion utilizing a tubular water quench process is presently preferred for forming the multilayer films of the instant invention. These multilayer films can be formed into useful articles such as packages, e.g. pouches, containers, and the like by conventional processes for making such articles including blow molding, stretch blow molding, and similar processes.

What we claim is:

1. An easy open, peelable seal package comprising:
   a first package wall having a multilayer film construction, said multilayer film construction comprising a first layer comprising ethylene vinyl acetate copolymer, plastomer and polybutylene; a second layer comprising high density polyethylene and polybutylene; a third layer comprising a single polymeric material or a blend of polymeric material; a fourth layer comprising a single polymeric material or a blend of polymeric material and a fifth layer comprising a single polymeric material or a blend of polymeric material; and
   a second package wall joined at a portion of its perimeter to said first package wall; wherein said first layer of said first package wall is heat sealed to said second package wall to create a sealed package such that a surface bond is formed between said first layer of said first package wall and said second package wall having a greater bond strength than a cohesive bond between the interface of said first layer and said second layer of said first package wall such that upon application of digital pull apart force said first and second package walls will remain bonded together and peeling will occur at said cohesive bond or peeling will occur at said surface bond between the interface of said first layer and first layer of said second package wall.

2. The easy open, peelable seal package of claim 1, wherein the polymeric material of said third layer of said first package wall is high density polyethylene.

3. The easy open, peelable seal package of claim 1, wherein the polymeric material of said fourth layer of said first package wall is selected from the group consisting of high density polyethylene and linear low density polyethylene.

4. The easy open, peelable seal package of claim 1, wherein the polymeric material of said fifth layer of said first package wall is high density polyethylene.

5. The easy open, peelable seal package of claim 1, wherein said second package wall has a multilayer film construction such that a first layer of said second package wall which is bonded to said first layer of said first package wall comprises the same polymer as said first layer of said first package wall.

6. The easy open, peelable package of claim 1, wherein the second package wall comprises a multilayer film construction, said multilayer film construction comprises a first layer comprising ethyl vinyl acetate copolymer, plastomer and polybutylene; a second layer comprising high density polyethylene and polybutylene; a third layer comprising a single polymeric material or a blend of polymeric materials; a fourth layer comprising a single polymeric material or a blend of polymeric materials and a fifth layer comprising a single polymeric material or a blend of polymeric materials and a package wall joined a portion of its perimeter to said first package wall; wherein said first layer of said first package wall is heat sealed to said first layer of said second package wall.

7. The easy open, peelable seal package of claim 6, wherein the polymeric material of said third layer of said second package wall is high density polyethylene.

8. The easy open, peelable seal package of claim 6, wherein the polymeric material of said fourth layer of said second package wall is selected from the group consisting of high density polyethylene and linear low density polyethylene.

9. The easy open, peelable seal package of claim 6, wherein the polymeric material of said fifth layer of said second package wall is high density polyethylene.

10. The easy open, peelable package of claim 1, wherein said first layer comprises between 20 to 50 percent ethylene vinyl acetate copolymer by weight; between 30 to 60 percent plastomer by weight; and between 5 to 25 polybutylene by weight.

11. The easy open, peelable package of claim 1, wherein said second layer comprises between 20 to 80 percent high density polyethylene by weight and between 20 to 80 percent polybutylene by weight.

12. The easy open, peelable package of claim 6, wherein said first layer comprises between 20 to 50 percent ethylene vinyl acetate by weight; between 30 to 60 percent plastomer by weight; and between 5 to 25 polybutylene by weight.

13. The easy open, peelable package of claim 6, wherein said second layer comprises between 20 to 80 percent high density polyethylene by weight and between 20 to 80 percent polybutylene by weight.

14. A multilayer film construction comprising a first layer comprising ethylene vinyl acetate copolymer, plastomer and polybutylene; a second layer comprising high density polyethylene and polybutylene; a third layer comprising a single polymeric material or a blend of polymeric materials; a fourth layer comprising a single polymeric material or a blend of polymeric material and a fifth layer comprising a single polymeric material or a blend of polymeric materials.

15. The multilayer film construction of claim 14, wherein said second layer comprises between 20 to 80 percent high density polyethylene by weight and between 20 to 80 percent polybutylene by weight.

16. The multilayer film construction of claim 14, wherein said first layer comprises between 20 to 50 percent ethylene vinyl acetate by weight; between 30 to 60 percent plastomer by weight; and between 5 to 25 polybutylene by weight.

17. The multilayer film construction of claim 14, wherein the polymeric material of said third layer is high density polyethylene.

18. The multilayer film construction of claim 14, wherein the polymeric material of said fourth layer is selected from the group consisting of high density polyethylene and linear low density polyethylene.

19. The multilayer film construction of claim 14, wherein the polymeric material of said fifth layer is high density polyethylene.

20. A multilayer film construction comprising: a first layer comprising ethylene vinyl acetate copolymer, plastomer and polybutylene which is adjacent to a second layer comprising high density polyethylene and polybutylene.

21. The multilayer film construction of claim 20, wherein said construction can be bonded to one or more other polymeric layers.

22. The easy open, peelable seal package of claim 1, wherein said first layer of said first package wall is heat sealed between 180° F. to 250° F. to said second package wall.

23. The easy open, peelable seal package of claim 22, wherein said first layer of said first package wall is heat sealed between 180° F. to 210° F. to said second package wall.

24. The easy open, peelable seal package of claim 22, wherein said first layer of said first package wall is heat sealed between 210° F. to 250° F. to said second package wall.

* * * * *